(12) United States Patent
Bradley et al.

(10) Patent No.: US 7,797,166 B1
(45) Date of Patent: *Sep. 14, 2010

(54) SYSTEMS AND METHODS FOR GENERATING A MODEL FOR INCOME SCORING

(75) Inventors: Michael G. Bradley, Potomac, MD (US); J. Douglas Gordon, Arlington, VA (US); Pamela W. Sims, Arlington, VA (US)

(73) Assignee: Federal Home Loan Mortgage Corporation (Freddie Mac), McLean, VA (US)

( * ) Notice: Subject to any disclaimer, the term of this patent is extended or adjusted under 35 U.S.C. 154(b) by 888 days.

This patent is subject to a terminal disclaimer.

(21) Appl. No.: 10/283,338

(22) Filed: Oct. 30, 2002

(51) Int. Cl.
*G06Q 10/00* (2006.01)
(52) U.S. Cl. .......................... 705/1.1; 705/35
(58) Field of Classification Search .............. 705/36, 705/1, 38, 35
See application file for complete search history.

(56) References Cited

U.S. PATENT DOCUMENTS

| | | | |
|---|---|---|---|
| 5,361,201 A | 11/1994 | Jost et al. | |
| 5,611,052 A | 3/1997 | Dykstra et al. | |
| 5,857,174 A | 1/1999 | Dugan | 705/1 |
| 5,930,776 A * | 7/1999 | Dykstra et al. | 705/38 |
| 5,940,812 A * | 8/1999 | Tengel et al. | 705/38 |
| 6,014,645 A * | 1/2000 | Cunningham | 705/38 |
| 6,088,686 A * | 7/2000 | Walker et al. | 705/38 |
| 6,112,190 A * | 8/2000 | Fletcher et al. | 705/36 R |
| 6,253,186 B1 * | 6/2001 | Pendleton, Jr. | 705/2 |
| 6,324,524 B1 | 11/2001 | Lent et al. | |
| 6,330,546 B1 * | 12/2001 | Gopinathan et al. | 705/35 |
| 6,401,070 B1 | 6/2002 | McManus et al. | 705/1 |
| 6,516,056 B1 | 2/2003 | Justice et al. | |
| 6,567,791 B2 | 5/2003 | Lent et al. | |
| 6,609,118 B1 | 8/2003 | Khedkar et al. | |
| 6,834,120 B1 | 12/2004 | LeClerc et al. | |

(Continued)

FOREIGN PATENT DOCUMENTS

JP 59216265 12/1984

(Continued)

OTHER PUBLICATIONS

James T. McClave and P. George Benson, A First Course in Business Statistics (5th ed. 1992). (MacMillan Publishing covering pp. 521 through 593).*

(Continued)

*Primary Examiner*—Naresh Vig
(74) *Attorney, Agent, or Firm*—Finnegan, Henderson, Farabow, Garrett & Dunner L.L.P.

(57) ABSTRACT

Systems and methods consistent with the present invention generate a model for providing one or more scores indicating a likelihood that a stated income is faulty. In one embodiment, the method includes, for example, receiving information representative of at least one borrower; receiving a first income value for the at least one borrower; and receiving a second value for the at least one borrower, such that the second income value verifies the first income value. Moreover, the method includes determining one or more parameters for the model based on the received information, the received first income value, and the received second income value, such that the one or more parameters enable the model to provide the one or more scores.

35 Claims, 13 Drawing Sheets

U.S. PATENT DOCUMENTS

| | | | | |
|---|---|---|---|---|
| 7,107,241 | B1* | 9/2006 | Pinto | 705/38 |
| 7,236,952 | B1 | 6/2007 | D'Zmura | |
| 7,289,965 | B1 | 10/2007 | Bradley et al. | |
| 2002/0007341 | A1 | 1/2002 | Lent et al. | |
| 2002/0040339 | A1 | 4/2002 | Dhar et al. | |
| 2002/0087389 | A1 | 7/2002 | Sklarz et al. | |
| 2002/0099649 | A1* | 7/2002 | Lee et al. | 705/38 |
| 2002/0133371 | A1 | 9/2002 | Cole | |
| 2002/0194119 | A1 | 12/2002 | Wright et al. | |
| 2003/0093366 | A1 | 5/2003 | Halper et al. | |
| 2003/0120591 | A1* | 6/2003 | Birkhead et al. | 705/39 |
| 2007/0136187 | A1* | 6/2007 | Libman | 705/38 |

FOREIGN PATENT DOCUMENTS

| | | |
|---|---|---|
| JP | 04052198 | 2/1992 |
| JP | 2002312458 | 10/2002 |

OTHER PUBLICATIONS

Staal Vinterbo and Lucila Ohno-Machado, A Genetic Algorithm to Select Variables in Logistic Regression: Example in the Domain of Myocardial Infarction, (1999).*

The University of San Antonio, 2005-2007 Graduate Catalog Course Descriptions Computer Science (CS) (visited Nov. 3, 2006), http://www.utsa.edu/gcat/chapter7/cos/Cs.cfm>.*

Software Prototyping, Sep. 22, 1998, printed from http://nas.cl.uh.edu/helm/swen5231/PROTO_HTML/index.htm.*

Lenders Tap IRS To Check Income Info, Jan. 12, 1997, The Sacramento Bee, p. I.3.*

USDA's Subsidized-Meal-Program Certification To Undergo Review, Oct. 21, 2002, Nation's Restaurant News, vol. 36, Iss 42, p. 20.*

Lewis, Edward M., "An Introduction to Credit Scoring," Library of Congress Catalog No. 90-92258, pp. I-169, 1994, San Rafael, CA.

http://www.myfico.com/myfico/CreditCentral/ScoringWorks.asp, pp. 1-2, Oct. 28, 2002.

http://www.myfico.com, p. 1, Oct. 28, 2002.

Dum, Mary, "Whay CASA for Fitch?", American Banker-Bond Buyer, a division of Thomson Publishing Corporation, vol. 9, No. 1; p. 36, Jan. 2002/Feb. 2002.

U.S. Appl. No. 10/095,006, entitled "Systems and Methods for Generating a Model for Home Value Scoring," filed Mar. 12, 2002.

U.S. Appl. No. 10/094,806, entitled "Systems and Methods for Home Value Scoring," filed Mar. 12, 2002.

U.S. Appl. No. 10/283,339, entitled "Systems and Methods for Income Scoring," filed Oct. 30, 2002.

T. Cornwell, "Ocwen Puts Vendor Management on New 'Net Site," National Mortgage News, Oct. 16, 2000, p. 8, vol. 25, Iss. 4, New York.

Software Prototyping, http://nas.cl.uh.edu/helm/swen5231/PROTO_HTML/index.htm, Sep. 22, 1998, pp. 1-32.

D. Nichols, "Sample Letter," University of Georgia, Dec. 12, 1998.

Netsavvy Communications, E-commerce News: Cyber Cast to offer "eFalcon" fraud detection service, Aug. 19, 1999.

"Logistic Regression," listserv.uga.edu, Enterprise Information Technology Services, The University of Georgia, listhelp@uga.edu, Dec. 18, 1998.

Louisiana State University, Department of Experimental Statistics Courses and Descriptions, http://www.stat.lsu.edu.

Patricia A. Murphy, "Fighting Internet Card Fraud," Jul. 2000.

PR Newswire, "Paymentech Deploys Efalcon for Fraud Reduction Service Within Existing Payment Transaction Process," Oct. 16, 2000.

FairIsaac, "Falcon Fraud Management Software—Customer Credit Card Fraud Protection," http://www.fairisaac.com/Fairisaac/Solutions/Product+Index/Falcon+Fraud+Manager.

Phillips Business Information Inc., "Security Pacific using ACAPs to Evaluate Credit and Speed up Loan Processing," Financial Services Reports, Apr. 17, 1991.

PR Newswire, "M&I Data Services and American Management Systems Announce Strategic Alliance to Provide Comprehensive Consumer Lending Solutions to Enhance Customer Relationships," Oct. 4, 1999.

D. Hymer, "Credit Scoring Can Speed Up Loan Process," The Santa Fe New Mexican, Apr. 28, 1996, p. G.1, Santa Fe, New Mexico (2 pages).

DSSStar, "Paymentech Deploys eFalcon for Fraud Reduction Service" (visited Nov. 9, 2006), http://www.taborcommunications.com/dssstar/00/1024/10235.html (3 pages).

"First American Real Estate Solutions Experiences Record Response to the Release of ValuePoint 04," Nov. 4, 2002, PR Newswire (2 pages).

H. Savage, "Lenders Ask for Tax Form," Washington Times, Jul. 7, 2000, p. F. 10, Washington, D.C. (2 pages).

Information on Realtor Workstation, T-III MLS Software, V.3.6., 2000 (62 pages).

M.L. Robbins, "Abstract of Methodology for Evaluating, Ranking, and Pricing Mountainous Wilderness Lands," (Univ. of Wisc.), 1983, AAT 8315024, The University of Wisconsin-Madison (2 pages).

"What is Model & Modeling,"(visited Feb. 16, 2008), <http://www.tiu.ac.ip/org/forum-01/index.files/Pages386.html> (2 pages).

Document cited in U.S. Appl. No. 10/679,516 and listed on Notice of References Cited mailed May 8, 2009 as "Metropolitan Regional Information Systems labeled as MRIS, printed on Oct. 14, 2007, 1997-1998 data displayed."

* cited by examiner

| |
|---|
| Loan/Reference Number |
| Requestor (i.e., the lender) |
| Borrower's name |
| Borrower's Income (as stated by the borrower) |
| Street Address |
| City |
| State |
| ZIP Code |
| Borrower's occupation |
| Borrower's years in current occupation |
| Borrower's property value |
| Total loan amount |
| Property Type (a flag indicating whether the loan is for a condominium, town house, single family home, 2-4 unit dwelling, or multifamily dwelling) |
| Purpose of loan (P=purchase, R=rate/term refinance (refi), C=cash out refinance, H=home improvement, D=debt consolidation, O=other) |
| Borrower's Credit Information (e.g., credit score(s), delinquencies, loan limits, outstanding balances, and/or ratios of credit limit to outstanding balance) |
| Source of Credit Information (1 for lender, 2 for Credit Repository) |
| Combined Point Value is an estimate from a database containing property estimates in a region, such as within a ZIP code, county, or state. |
| Income estimate is an estimate containing income (or salary) estimates for a region, such as a ZIP code, city, county, MSA, or state. |

FIG. 7

Sample Web Page Request

Enter the address and click "Submit" to retrieve an INCOME SCORE report.

Top of Form 1

| | | | |
|---|---|---|---|
| Loan/Ref #: | | | |
| Borrower's Name: | | Occupation | |
| Street: | | Years in Occupation | |
| Unit #: | | | |
| City: | | | |
| State: | AK | | |
| Zip Code: | | | |

Current Purchase/Refinance/Credit Information:

| Borrower's Current Income: | | First Lien Loan Amount: | |
|---|---|---|---|
| | | (if unknown, enter '0' for all amounts) | |
| Second Lien Loan Amount: | | Financial MI Amount: | |

| | | | | | |
|---|---|---|---|---|---|
| Property Type: | 1 | Single Family Residence | 2 | Condo | |
| | 3 | Two-Four Unit | | | |
| Loan Purpose: | 1 | Purchase | 2 | Cash-out Refinance | |
| | 3 | Non Cash-out Refinance | | | |
| | 4 | Home Improvement | | | |
| | 5 | Debt Consolidation | 6 | Other | |

| Credit Source: | 1 | Lender | 2 | Credit Repository |
|---|---|---|---|---|
| Income Score: | | | | |

| Submit | Reset values |
|---|---|

Bottom of Form 1

Home

FIG. 8

| | |
|---|---|
| 1. | INCOME_SCORE = 100 |
| 2. | +1*CREDIT_SCORE |
| 3. | -10*CO  \\** Purpose of loan is cash out (CO) **\\ |
| 4. | +10*NCO  \\** Purpose of loan is non-cash out (NCO) **\\ |
| 5. | +0*OTH  \\** Purpose of loan is other **\\ |
| 6. | -30* DELINQUENCIES |
| 7. | -100,000* INCOME_DIFF |
| 8. | |
| 9. | If INCOME_SCORE < 300 then INCOME_SCORE = 300  \\** scaling score to a range **\\ |
| 10. | If INCOME_SCORE > 900 then INCOME_SCORE = 900 |

FIG. 9

Sample Web Page With Result

Prepared For: Lender Name    Loan Number: TEST0409A

INCOME SCORE REPORT for 2801 SUNSET DR NE : 300

BORROWER INFORMATION:

Borrower Name: My Name
Street Address: 2801 SUNRISE DR NE
City: Rochester    State: NY    Zip: 14621 – 1234

Scores below 500 are at highest risk
Scores below 600 are at moderate risk
Scores above 700 have lowest risk

INCOME SCORE: 750

FIG. 10

| BORROWER ID | STATED INCOME | VERIFIED INCOME | OUT-COME | CREDIT_SCORE | CO | NCO | OTH | DELIN-QUENCIES | INCOME_DIFF |
|---|---|---|---|---|---|---|---|---|---|
| 1 | $100,000 | $105,000 | 0 | 775 | 0 | 1 | 0 | 0 | 0.9 |
| 2 | $50,000 | $20,000 | 1 | 400 | 1 | 0 | 0 | 3 | 0.2 |
| 3 | $175,000 | $125,000 | 1 | 450 | 1 | 0 | 0 | 4 | 0.95 |
| 4 | $50,000 | $49,900 | 0 | 800 | 0 | 0 | 1 | 0 | 0.45 |
| ... | ... | | | | | | | | |
| Nth Borrower | $75,000 | $75,000 | 0 | 790 | 0 | 0 | 1 | 0 | 0.60 |

FIG. 13

SYSTEMS AND METHODS FOR GENERATING A MODEL FOR INCOME SCORING

BACKGROUND OF THE INVENTION

I. Field of the Invention

The present invention generally relates to financial systems and to systems and methods for processing financial information. More particularly, the invention relates to systems and methods for processing financial information, such that the processing determines a model capable of providing an indication of the likelihood that a reported or stated income is likely to be faulty.

II. Background and Material Information

When a borrower applies for a loan, the borrower may complete a loan application that includes, among other things, the borrower's income. This self-reported (or stated) income represents the borrower's current income, which will be used by the lender to process the loan.

When the lender subsequently processes the borrower's loan application, the lender may not have ready access to information that verifies the borrower's stated income. If the lender seeks to process the loan rapidly, which is usually the case, for example, in the Internet environment, the lender may process the loan and make a decision to approve or reject the loan based on the income stated by the borrower on the loan application. Also, mortgage lenders may have mortgage loan programs with few, if any, documentation requirements. These low (or no) documentation loan programs may use a borrower's stated income in their lending decision. Moreover, these mortgage programs may need to make an "on-the-spot" decision to approve a mortgage application while the borrower is present without requiring the borrower to return home to search for tax returns, pay stubs, or W-2s. As a result, the lender has an interest in determining quickly and cheaply the veracity of income, whether self-reported by the borrower or reported by another entity as a valid representation of income

SUMMARY OF THE INVENTION

Accordingly, the present invention is directed to systems and methods for processing financial information and, more particularly, the invention relates to systems and methods for processing financial information, such that the processing determines a model capable of providing an indication of the likelihood that a reported or stated income is likely to be faulty.

A financial system consistent with the systems and methods of the present invention may generate a model for providing one or more scores indicating a likelihood that a stated income is faulty. The financial system may receive information representative of at least one borrower. Moreover, the system may receive a first income value for the at least one borrower and receive a second value for the at least one borrower. The second income value may verify the first income value. In addition, the system may determine one or more parameters for the model based on the received information, the received first income value, and the received second income value, such that the one or more parameters enable the model to provide the one or more scores.

Additional features and advantages of the invention will be set forth in part in the description that follows and in part will be obvious from the description, or may be learned by practice of the invention. The objectives and advantages of the invention may be realized and attained by the system and method particularly described in the written description and claims hereof as well as the appended drawings.

To achieve these and other advantages and in accordance with the purpose of the invention, as embodied and broadly described herein, methods consistent with the present invention may also provide a score indicating that a stated income for a borrower is likely to be faulty. The method also includes, for example, receiving information representative of the stated income; and determining the score based on the received information and a model, such that the score indicates a likelihood that the stated income is faulty.

It is to be understood that both the foregoing general description and the following detailed description are exemplary and explanatory only and are not restrictive of the invention, as described. Further features or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, illustrate various embodiments and aspects of the present invention and, together with the description, explain the principles of the invention. In the drawings:

FIG. 7 illustrates exemplary information used to determine a borrower's Income Score in accordance with systems and methods consistent with the present invention;

FIG. 8 depicts an exemplary web page interface for providing information in accordance with systems and methods consistent with the present invention;

FIG. 9 shows an exemplary model for determining an Income Score indicating the likelihood that a stated income is likely to be faulty in accordance with systems and methods consistent with the present invention;

FIG. 10 depicts an exemplary web page interface for receiving an Income Score in accordance with systems and methods consistent with the present invention;

FIG. 13 shows an exemplary table for determining coefficients of the model in accordance with systems and methods consistent with the present invention.

DETAILED DESCRIPTION

Figure 1:
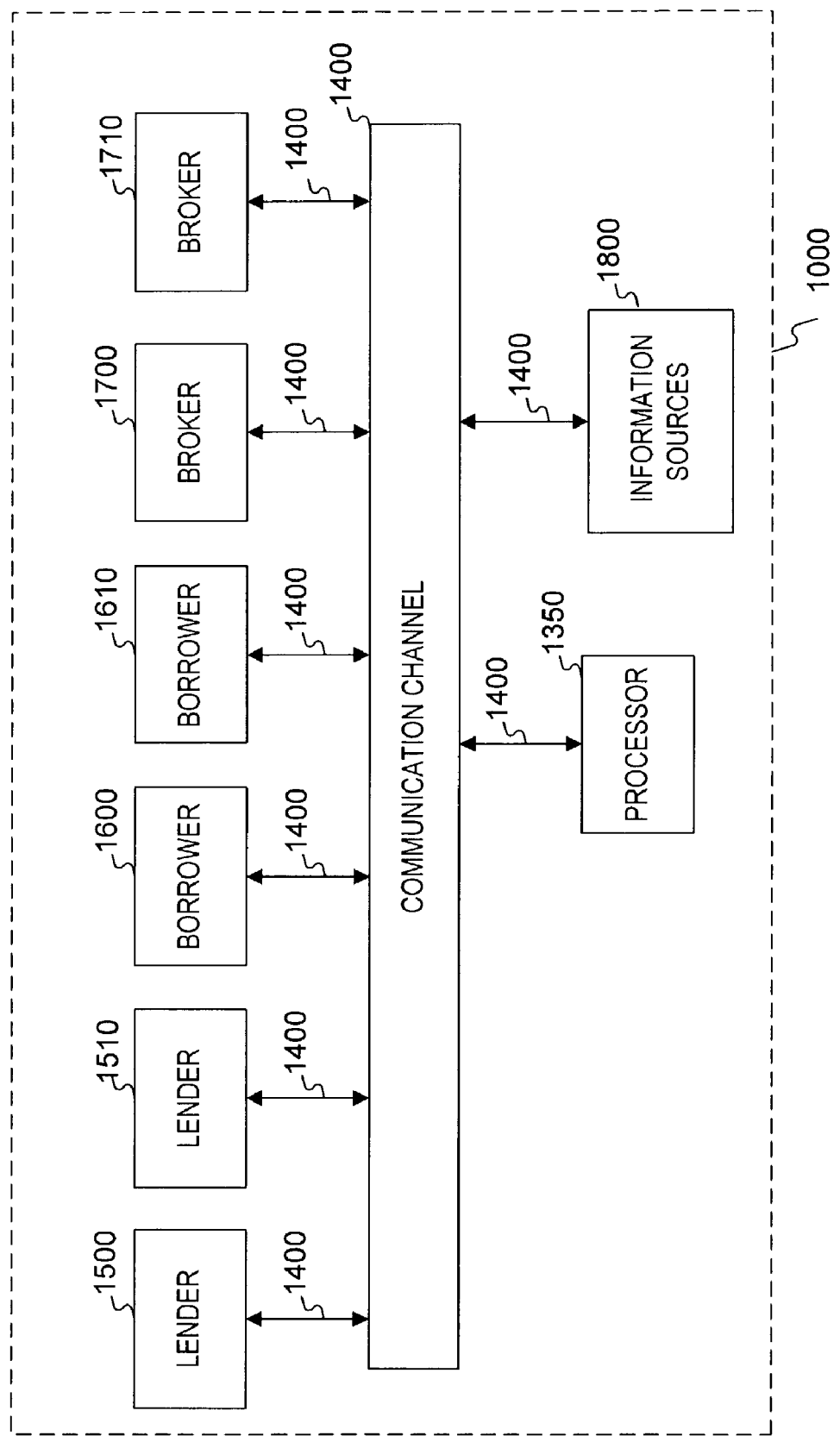
FIG. 1 illustrates an exemplary system environment in accordance with systems and methods consistent with the present invention.

Reference will now be made in detail to the invention, examples of which are illustrated in the accompanying drawings. Wherever possible, the same reference numbers will be used throughout the drawings to refer to the same or like parts.

Systems and methods consistent with the present invention permit a financial entity, using a computing platform (or computer), to determine an indication of whether a stated income or reported income for a borrower is likely to be faulty. In one embodiment, the financial entity may determine such indication in the form of an Income Score.

In one embodiment, a stated (or reported) income that is faulty would include one that does not accurately represent the borrower's actual income, such as a stated income that is either higher or lower than the borrower's actual income. Stated income, as used herein, means any value that represents (or claims to represent) an actual income amount. An actual income amount, as used herein, means any value that represents a borrower's true income. Although stated income may be self-reported by a borrower, a skilled artisan would recognize that any entity may report the borrower's purported income instead.

In one aspect of the invention, the computing platform determines the Income Score based on a model and received income information, such as the borrower's stated income. The computing platform then scales the Income Score into a range (e.g., 300 to 900) with a low score indicating a high likelihood that the stated income is faulty (i.e., the stated income is probably false) and a high score indicating a low likelihood that the stated income is faulty (i.e., the stated income is probably true). Alternatively, a high score could be used to indicate a high likelihood that the stated income is false (e.g., stated income is too high or too low when compared to the borrower's actual income).

By way of example only, a borrower may include an income on an application, such as a loan application, credit card application, or mortgage application. A financial entity, such as a lender, bank, mortgage bank, or mortgage broker, may process the borrower's application based on, among other things, the income stated on the borrower's application. If the borrower's stated income qualifies the borrower for the loan, the financial entity may approve the loan. Moreover, by using the borrower's stated income, the financial entity may quickly approve (or reject) the loan amount or line of credit. The financial entity thus has an interest in assessing the likelihood of whether the borrower's stated income is faulty. Otherwise, the financial entity may incorrectly approve or reject the loan or credit line.

By using the Income Score, the financial entity may determine the likelihood that the borrower's stated income is faulty. When the Income Score indicates a low likelihood that the stated income is faulty, the lender may simply process the loan application to approve or reject the loan because the borrower's stated income is probably true (e.g., stated income is about equal to, or lower than, the borrower's true income). On the other hand, when the Income Score indicates a high likelihood that the stated income is faulty, the lender may take additional measures before approving or rejecting the loan because the stated income is probably false (e.g., stated income is higher than the borrower's true income). Such measures may include verifying the borrower's income by requesting additional income information from the borrower, the borrower's employer, and/or a financial database capable of verifying the borrower's stated income.

The following detailed description refers to mortgage loans to facilitate explanation, and such references should in no way be construed to limit the systems and methods described herein.

FIG. 1 shows an exemplary system 1000 for providing an indication of whether a stated or reported income is likely to be faulty. The indication may be in the form of an Income Score, enabling a financial entity to readily determine the likelihood that the borrower's income is faulty.

Referring to FIG. 1, the system includes a communication channel 1400, one or more lenders 1500, 1510, one or more borrowers 1600, 1610, one or more brokers 1700, 1710, one or more information sources 1800, and a processor 1350. The lenders 1500, 1510 may include a financial entity, such as a bank, mortgage bank, mortgage broker, mortgage originator, and any other entity seeking an indication of whether the borrower's stated income is likely to be faulty. The borrowers 1600, 1610 may include an entity, such as a consumer, seeking a mortgage. The brokers 1700, 1710 may include an entity that acts as an agent, such as a mortgage broker. The processor 1350 may include an entity capable of processing information such that an Income Score is provided to, for example, the lender, borrower, broker, and any other entity requesting the Income Score. The information sources 1800 may include internal, external, proprietary, and/or public databases, such as financial databases and demographic databases.

In one embodiment, the information sources 1800 may include information from one or more of the following: International Data Management Inc. (IDM), First American Corporation (First American), other property data providers, county property (or tax) records, TransUnion LLC (TransUnion), Equifax Inc. (Equifax), Experian, Department of Commerce, Internal Revenue Service (IRS) statistics on income, and Bureau of Labor Statistics. Moreover, the information from the Bureau of Labor Statistics may include detailed salary statistics based on one or more of the following: occupation, level of experience, and region, such as city, state, or Metropolitan Statistical Area (MSA). For example, the Bureau of Labor Statistics may include income estimates for hundreds of occupations and professions.

Although the communication channel 1400 is depicted in FIG. 1 as bi-directional, a skilled artisan would recognize that unidirectional communication links may be used instead.

Figure 2:
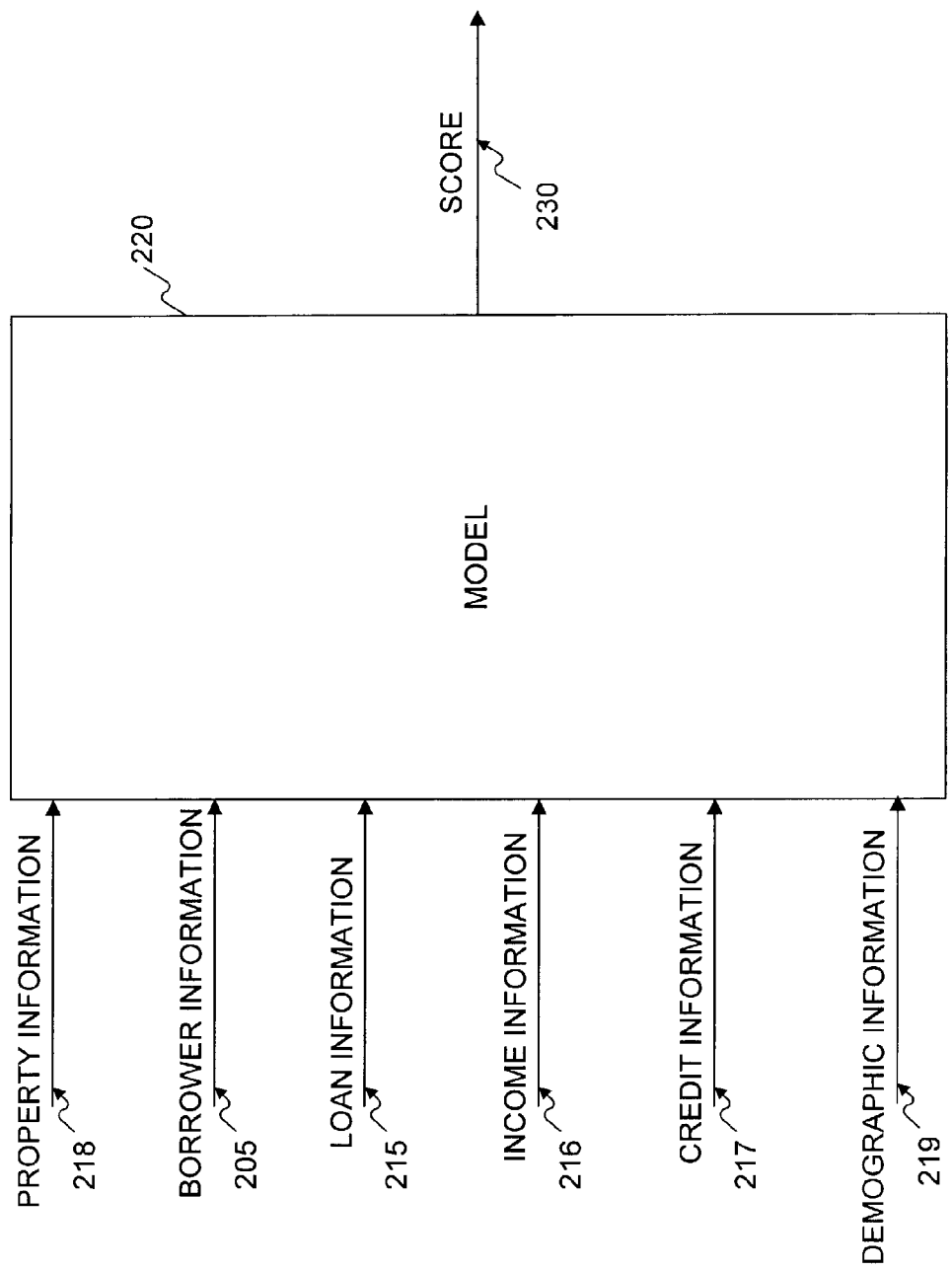
FIG. 2 is an exemplary block diagram for providing an indication that a stated income is likely to be faulty based on a model in accordance with systems and methods consistent with the present invention.

FIG. 2 depicts a functional block diagram associated with providing the Income Score consistent with the systems and methods of the present invention. FIG. 2 depicts a model 220, serving as a mathematical model or transform, that determines a score 230. The score provides an indication of the likelihood that the borrower's stated income is faulty (or false). For example, a financial entity or information source may provide the processor 1350 with information, such as one or more of the following: information describing the borrower 205; loan (or application) information 215; information describing the borrower's income 216, such as the income reported by the borrower to the lender on a mortgage loan application; credit information 217; property information 218; and demographic information 219 (e.g., salary statistics). The processor 1350 may then use the model 220 to determine the Income Score and provide the score 230 to the lender 1500 via the communication channel 1400. Accordingly, the lender 1500 may more accurately evaluate the borrower's income when processing the mortgage loan application.

Figure 3:
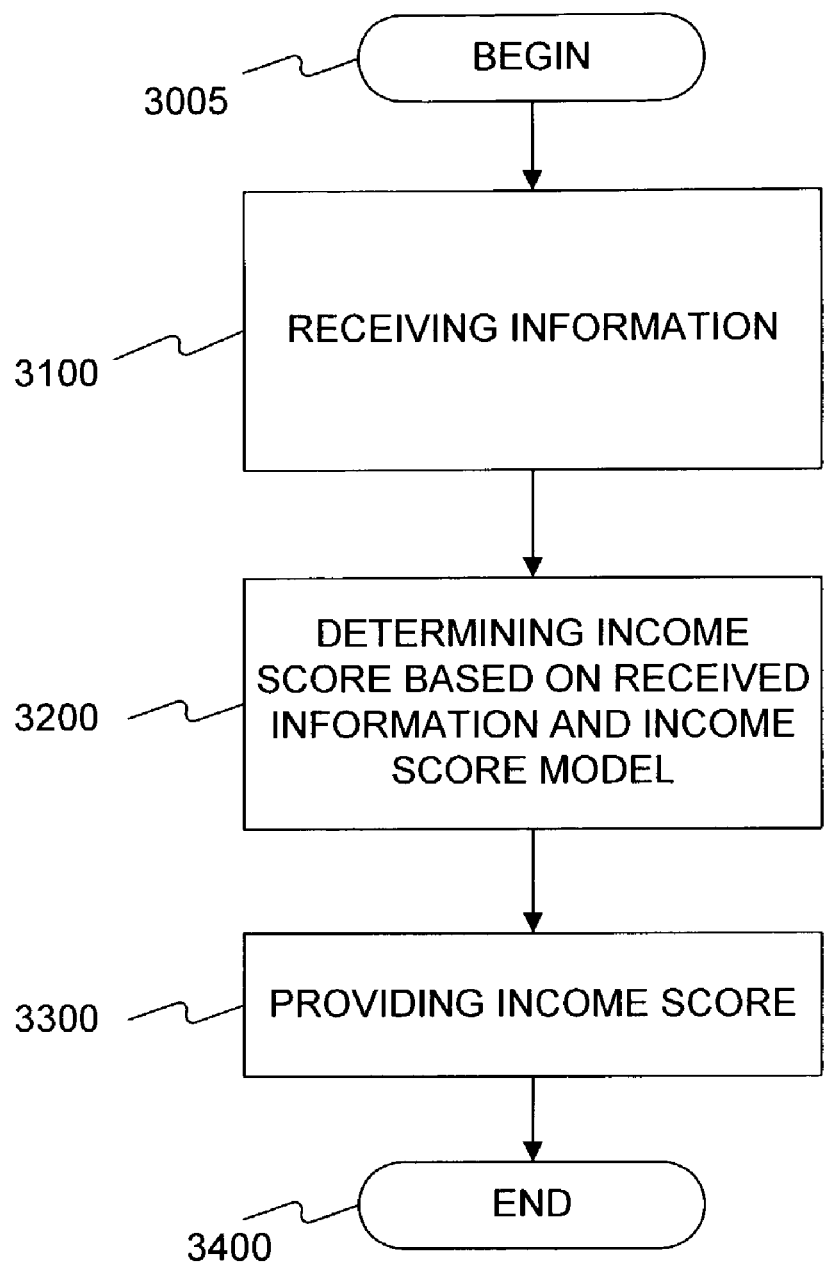
FIG. 3 is an exemplary flowchart for providing an Income Score based on received information and a model in accordance with systems and methods consistent with the present invention.

FIG. 3 is an exemplary flowchart depicting steps for providing the Income Score. Referring to FIGS. 1 and 3, in one embodiment, the processor 1350 may begin by receiving information through the communication channel 1400 from the lender 1500 (steps 3005-3100). The received information may include, for example, information describing the borrower and the borrower's income. In one aspect of the invention, the information describing the borrower may include one or more of the following: the borrower's name, address, occupation, years in occupation (or experience), and Social Security Number (SSN). Furthermore, the borrower's income information may include information reported by the borrower to the lender, such as the borrower's current annual income and/or the borrower's household income.

In one embodiment, the received information may also include detailed credit information for the borrower, such as a credit history. For example, detailed credit information for the borrower may be received from a lender and/or a credit repository such as TransUnion, Equifax, or Experian. When the detailed credit information is received from a credit repository, that information may include one or more of the following: number of accounts in the credit report, account balances in revolving credit lines, account limits in revolving credit lines, other account balances, mortgage balances, mortgage payments, tax payments, 30 day delinquencies, 60 or 90 day delinquencies, foreclosures, and other information reported by credit repositories. Moreover, the processor 1350 may also receive information, such as salary estimates and statistics based on occupation, region, and experience, from public sources, such as the Department of Commerce, IRS, or Bureau of Labor Statistics.

One of ordinary skill in the art would recognize that some of the information received in step 3100 may be received at any time (and stored) or received when a request is made by a lender for an Income Score. For example, before a specific request for a borrower's income score is made by a lender, information, such as salary estimates and statistics based on occupation, may be received and stored.

The processor 1350 may then determine the Income Score based on the received information (and/or stored information, if any) and the model 220 (step 3200). The processor 1350 may also provide the Income Score (step 3300) to the lender 1500 through the communication channel 1400. The lender 1500 may then use the Income Score to determine whether the borrower's income, as stated on the borrower's loan application, is likely to be faulty.

In one embodiment, the stated income is considered faulty when it differs significantly from the borrower's actual income. For example, if a borrower earns $20,400 dollars per year and reports $20,000, the borrower's stated income, although false, is not worrisome because the borrower has merely understated income, which results in no harm to the lender. In this example, the Income Score would not necessarily correspond to a low score indicating a false stated income. On the other hand, if a borrower earns $20,400 and reports $24,000 on a loan application, the stated income represents a worrisome exaggeration of the borrower's actual income. In this case, the Income Score would correspond to a low score.

When the Income Score is low (e.g., the exaggerated stated income example above), the lender may decide to review the borrower's application and verify the borrower's stated income. On the other hand, if the borrower's stated income in unlikely to be exaggerated (i.e., probably true), the lender may simply approve or reject the loan without further verifying the borrower's income.

In one embodiment, the processor 1350 may scale an Income Score such that the score falls within a range, such as 300-900. Table 1 below shows three exemplary Income Scores with a likelihood that the borrower's stated income is faulty and a proposed action for the lender 1500. For example, when the processor 1350 provides an Income Score of 500 to the lender 1500, the Income Score may indicate that the borrower's stated income is highly likely to be unreliable (or false). With the Income Score of 500, the lender 1500 may conduct a detailed review of the loan application including verifying the borrower's income by requesting income verification information, such as requesting pay stubs from the borrower, calling the borrower's employer, or requesting information from a credit bureau that lists income information for the borrower.

When the processor 1350 provides an Income Score of 600 to the lender 1500, the Income Score of 600 may indicate that the borrower's stated income is somewhat less likely to be unreliable than the 500 score. The lender 1500 may still conclude that a review of the borrower's loan application is appropriate. But in this case, the review may merely include verifying the borrower's stated income based on phone calls to employers or other income verification measures.

When the processor 1350 provides an Income Score of 700 to the lender 1500, the Income Score of 700 may indicate that the borrower's stated income is likely to be more reliable than the 600 score. In this case, the lender 1500 may be sufficiently confident that the income stated on the borrower's loan application is reliable. Accordingly, the lender 1500 may approve the loan based on the borrower's stated income without further verifying the stated income.

TABLE 1

Exemplary Income Scores

| INCOME SCORE FOR A BORROWER | LIKELIHOOD OF FAULTY INCOME | PROPOSED ACTION |
| --- | --- | --- |
| 500 | High | Conduct a detailed review that verifies the borrower's income, such as requesting pay statements. |
| 600 | Medium | Conduct a less detailed review, such as merely calling the borrower's employer, or, alternatively, decrease the importance of the borrower's stated income when approving the loan. |
| 700 | Low | Process the loan using the borrower's stated income. |

Although Table 1 shows three Income Scores between 500 and 700, any other range of Income Scores may be used instead including, for example, a range of Income Scores from 1 to 10 or 300 to 900. Alternatively, an alphabet-based or alphanumeric-based scale may also be used instead. For example, an alphabet-based approach may include a range of "A" to "D", while an alphanumeric-based approach may include a range of "A1" to "A10." Moreover, although Table 1 shows a higher score representing that the borrower's stated income is probably reliable (or good), a skilled artisan would recognize that a lower score could instead represent that the stated income is probably reliable.

In one embodiment, the Income Score may correspond to the combined Income Score for multiple borrowers. For example, when multiple borrowers (each with a corresponding individual score) apply for a single mortgage loan, the processor 1350 may combine the scores to determine a combined Income Score. The combined Income Score may then be scaled to fall within a range, such as 300-900. In this embodiment, the Income Score represent the veracity of the income (or combined income) of the borrowers.

Figure 4:
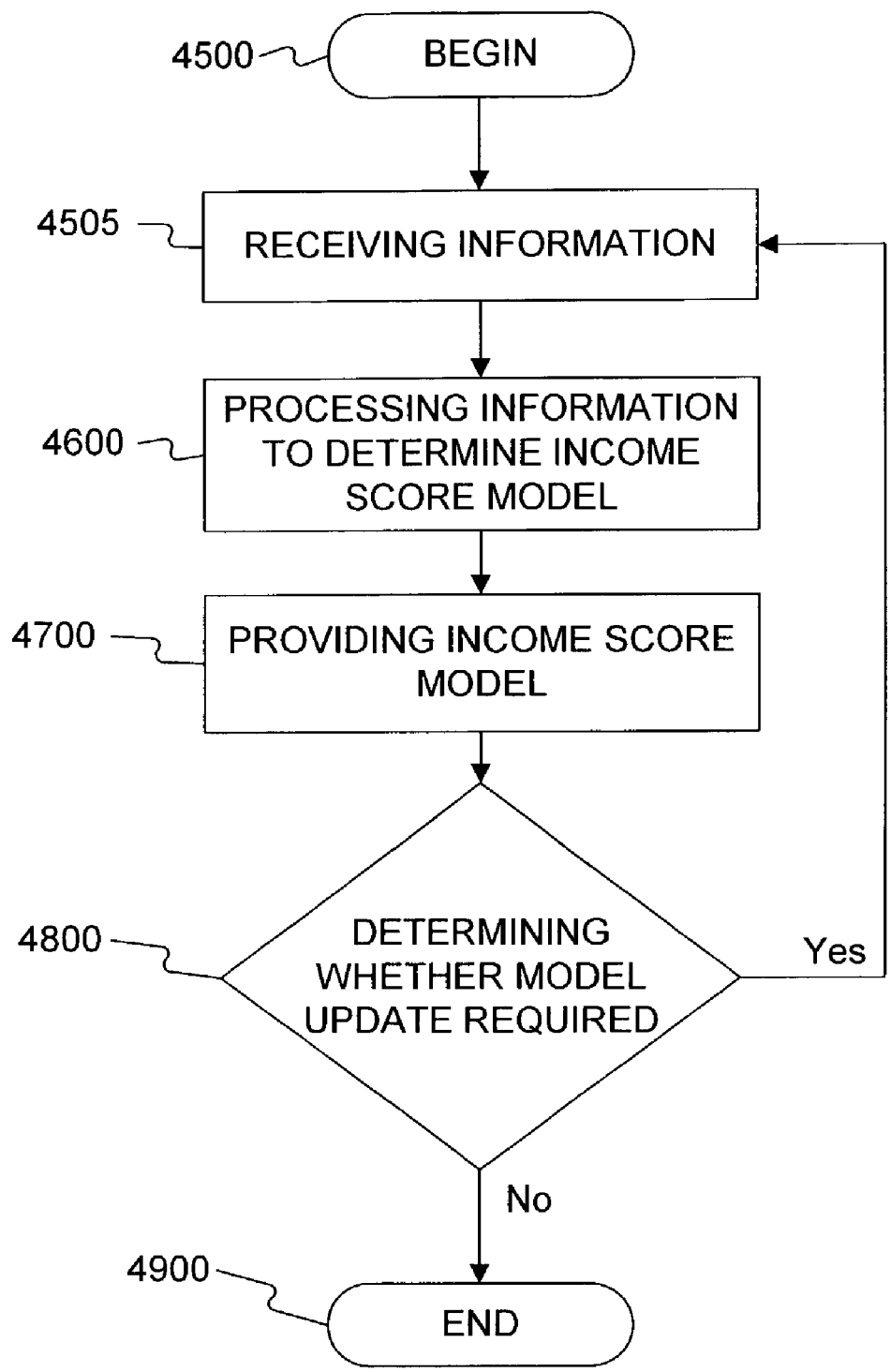
FIG. 4 is an exemplary flowchart for generating a model in accordance with systems and methods consistent with the present invention.

FIG. 4 is an exemplary flowchart depicting steps for generating a model, such as the Income Score model, capable of providing the Income Score. Referring to FIGS. 1 and 4, in one embodiment, the processor 1350 may begin by receiving information from information sources 1800 to enable the processor 1350 to generate the Income Score model (steps 4500-4505). The processor 1350 may then process the received information to determine the Income Score model (step 4600); and provide the Income Score model to one or more entities (e.g., lenders 1500, 1510 and/or brokers 1700, 1710), permitting those entities to determine (or use) the Income Scores for mortgage loan applications (step 4700). The Income Score model may then be used as the model 220 depicted in FIG. 2 to determine the score 230. Although the Income Score model is described herein, a skilled artisan would recognize that any type of model that provides a score may be used instead.

In one aspect of the invention, the processor 1350 may periodically (e.g., yearly, monthly, etc.) determine whether the Income Score model should be updated and then perform steps 4500-4700 (step 4800).

Figure 5:
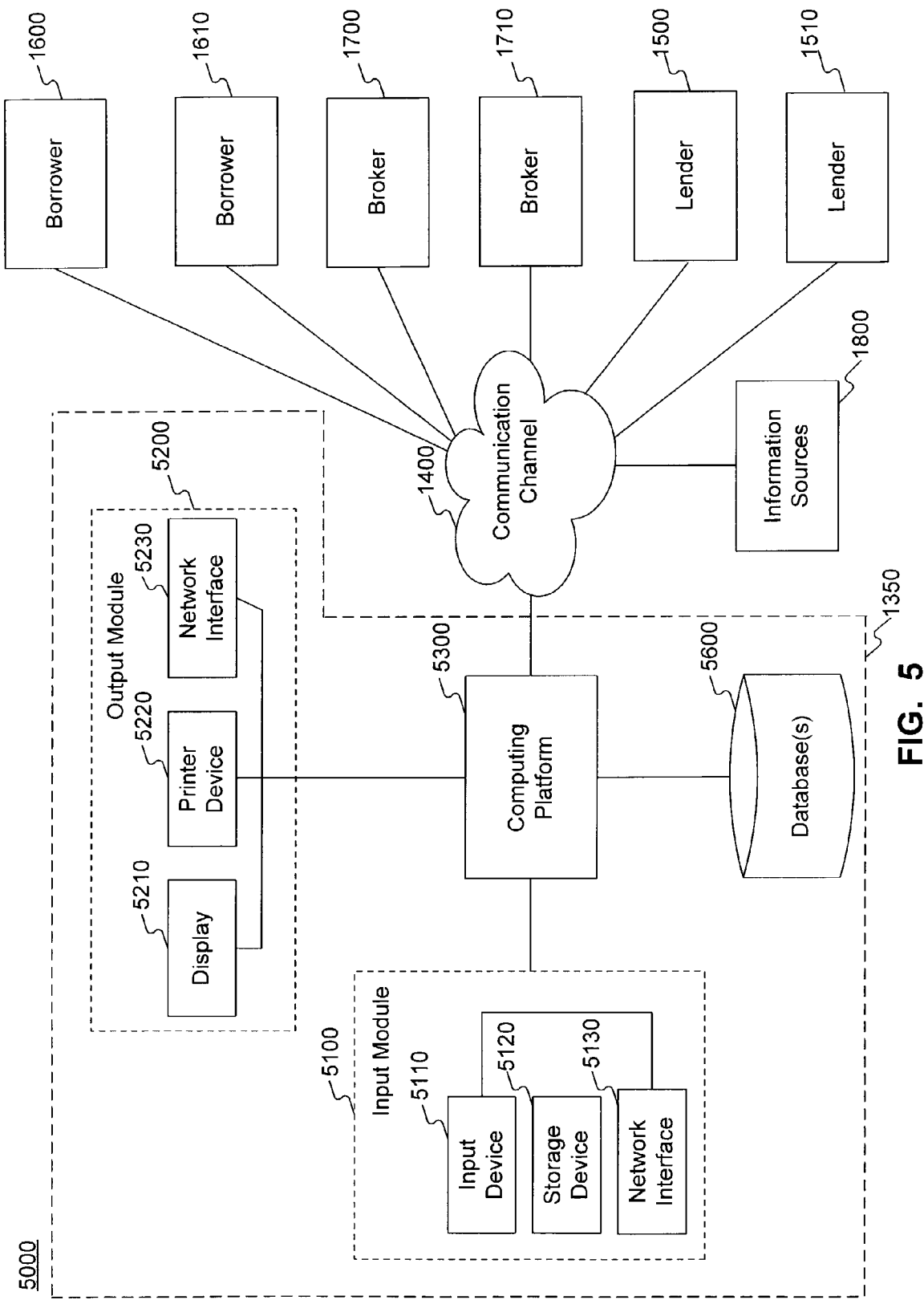
FIG. 5 illustrates another exemplary system environment in accordance with systems and methods consistent with the present invention.

FIG. 5 illustrates another exemplary system environment 5000 consistent with the systems and methods of the present invention. As illustrated in FIG. 5, the system 5000 includes a processor 1350, lenders 1500, 1510, borrowers 1600, 1610, brokers 1700, 1710, information sources 1800, and a communication channel 1400. The processor 1350 may also include an input module 5100, an output module 5200, a computing platform 5300, and one or more databases 5600.

In one embodiment consistent with FIG. 5, the computing platform 5300 may include a data processor such as a PC, UNIX server, or mainframe computer for performing various functions and operations. Computing platform 5300 may be implemented, for example, by a general purpose computer or data processor selectively activated or reconfigured by a stored computer program, or may be a specially constructed computing platform for carrying-out the features and operations disclosed herein. Moreover, computing platform 5300 may be implemented or provided with a wide variety of components or systems including, for example, one or more of the following: one or more central processing units, a co-processor, memory, registers, and other data processing devices and subsystems.

Communication channel 1400 may include, alone or in any suitable combination a telephony-based network, a local area network (LAN), a wide area network (WAN), a dedicated intranet, the Internet, or a wireless network. Further, any suitable combination of wired and wireless components and systems may be incorporated into the communication channel 1400. Although the computing platform 5300 may connect to the lenders 1500, 1510 through the communication channel 1400, computing platform 5300 may connect directly to the lenders 1500, 1510.

Computing platform 5300 also communicates with input module 5100 and/or output module 5200 using connections or communication links, as illustrated in FIG. 5. Alternatively, communication between computing platform 5300 and input module 5100 (or output module 5200) may be achieved using a network (not shown) similar to that described above for the communication channel 1400. A skilled artisan would recognize that computing platform 5300 may be located in the same location or at a geographically separate location from input module 5100 or output module 5200 by using dedicated communication links or a network.

Input module 5100 may be implemented with a wide variety of devices to receive and/or provide information. Referring to FIG. 5, input module 5100 may include an input device 5110, a storage device 5120, and a network interface 5130. Input device 5110 may also include a keyboard, a mouse, a disk drive, a telephone, or any other suitable input device for receiving and/or providing information to computing platform 5300. Although FIG. 5 only illustrates a single input module 5100, a plurality of input modules 5100 may also be used.

Storage device 5120 may be implemented with a wide variety of systems, subsystems, and/or devices for providing storage (or memory) including, for example, one or more of the following: a read-only memory (ROM) device, a random access memory (RAM) device, a tape or disk drive, an optical storage device, a magnetic storage device, a redundant array of inexpensive disks (RAID), and/or any other device capable of providing storage.

Network interface 5130 may facilitate data exchange between the communication channel 1400 and computing platform 5300 and may also facilitate data exchange between the input module 5100 and the computing platform 5300. In one aspect of the invention, network interface 5130 may permit a connection to at least one or more of the following networks: an Ethernet network, an Internet protocol network, a telephone network, a radio network, a cellular network, or any other network capable of being connected to input module 5100.

Output module 5200 may include a display 5210, a printer 5220, and a network interface 5230. The output module 5200 may be used to provide, inter alia, Income Scores to lenders 1500, 1510, provide an Income Score model to the computing platform 5300, and/or provide the Income Score model to any entity or processor. Further, the output from computing platform 5300 may be viewed through display 5210 (e.g., a cathode ray tube or liquid crystal display) and printer device 5220. For example, the Income Score may be viewed on display 5210 and on printer device 5220. Although FIG. 5 only illustrates a single output module 5200, a plurality of spatially separated output modules 5200 may be used instead.

Network interface 5230 may facilitate data exchanges between the output module 5200 and the computing platform 5300 and between the computing platform 5300 and the communication channel 1400. In one embodiment, the network interface 5230 may be similar to the network interface 5130 described above.

The database 5600 may store information received from the lenders, brokers, borrowers, and/or information sources. For example, the database 5600 may store information received from the information sources 1800 such as information from one or more of the following: IDM, First American, other property data providers, county property (or tax records), TransUnion, Equifax, Experian, Department of Commerce, IRS statistics on income, and Bureau of Labor Statistics. Although the database 5600 is shown in FIG. 5 as being located with the computing platform 5300, a skilled artisan would recognize that the database(s) may be located anywhere (and in multiple locations) and connected to the computing platform via direct links or networks. Similarly, although information sources are depicted in FIG. 5 as separate from the computing platform 5300 and processor 1350, a skilled artisan would recognize that the information sources may be located anywhere (and in multiple locations) and connected to the computing platform via direct links or networks.

Figure 6:
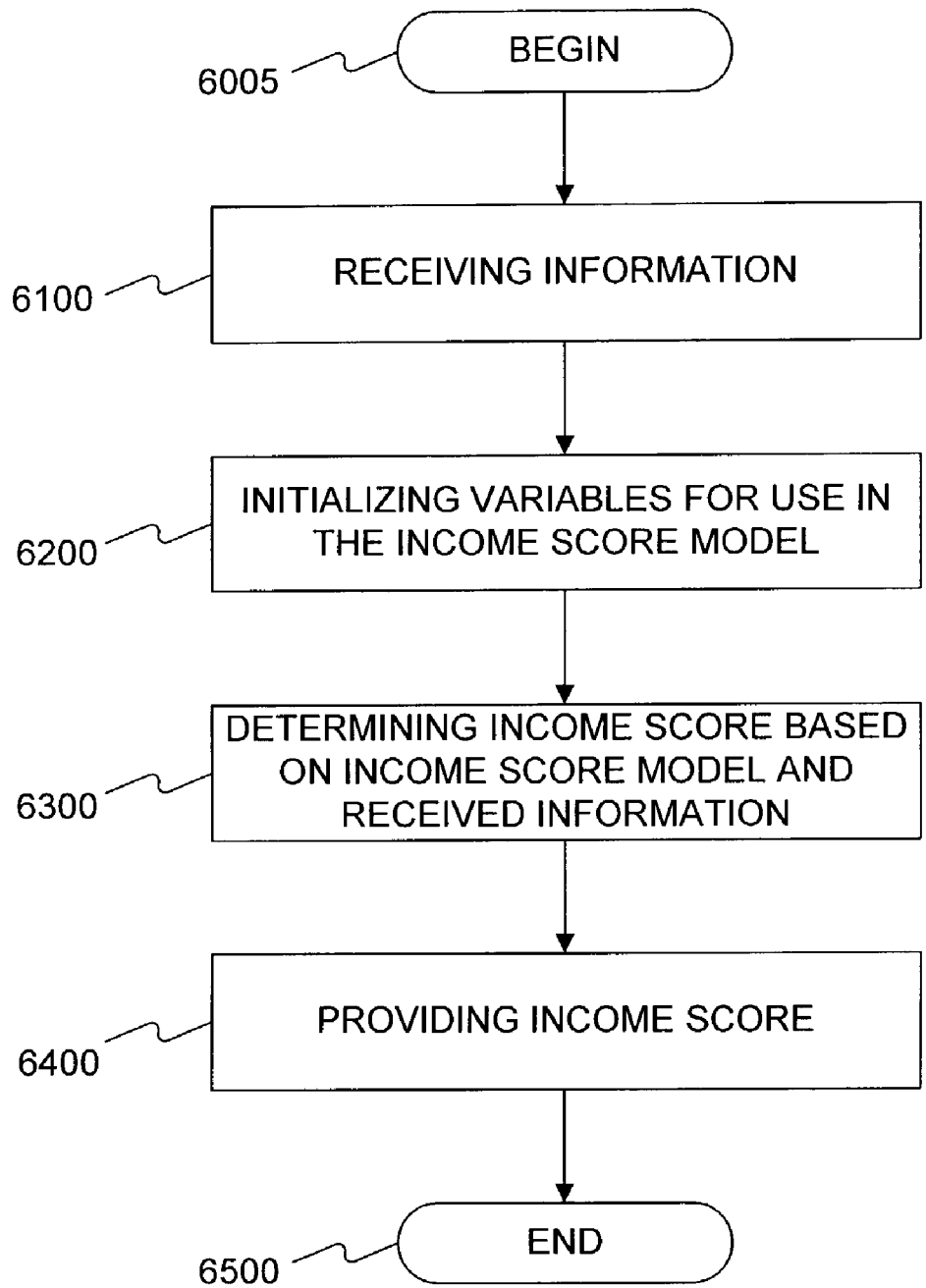
FIG. 6 is another exemplary flowchart for providing an Income Score in accordance with systems and methods consistent with the present invention.

FIG. 6 shows another exemplary flowchart with steps for providing the Income Score. Referring to FIGS. 5 and 6, the computing platform 5300 may begin when it receives, via the communication channel 1400, information (steps 6005-6100). The received information may include information provided by the borrower 1600 to the lender 1500, such as one or more of the following: the borrower's name, address, occupation, experience (or years in current position), stated income, and any other information included on the borrower's loan application. In addition, the received information may include credit information from information sources that provide credit history, such as First American, Equifax, TransUnion, or Experian. The received information may also include asset information, such as property and tax assessor information provided by First American, IDM, and other data providers; and demographic information, such as statistics detailing the borrower's estimated income based on the borrower's occupation, address, and/or experience.

The computing platform 5300 may initialize one or more variables for use in the Income Score model based on the received information (step 6200); determine the Income Score based on the Income Score model and received information (step 6300); and end when it provides the Income Score to, for example, the lender 1500 (steps 6400-6500).

To receive information (step 6100), the computing platform 5300 may receive from the lender 1500 information representative of the borrower. For example, the lender 1500 may provide the computing platform 5300 with the information listed on the borrower's loan application such as the borrower's name, address, occupation, experience (or years in current position), SSN, and stated income. In addition, the computing platform may receive other information from other sources. For example, the received information may also include the borrower's credit history received from credit information repositories; property (or asset) information, such as an address for the borrower's property and an appraised value for that property; and demographic information including income (or salary) information, such as estimates (or statistics) on income received from the Bureau of Labor Statistics.

In one embodiment, the computing platform 5300 stores in database 5600 income statistics based on, inter alia, income estimates (or statistics) from the Bureau of Labor Statistics. Moreover, the stored statistics enable the computing platform 5300 to retrieve income information based on demographics, such as the borrower address (e.g., city, state, or MSA), occupation, and years of experience. For example, the computing platform 5300 may retrieve income statistics for a lawyer, with 20 years experience, living in the Baltimore, Washington, and Virginia MSA. The retrieved income statistic for that lawyer may indicate an average income of about $60,000 per year. The income statistic may also be used as received information in step 6100.

In one embodiment, the computing platform 5300 may receive information through the communication channel 1400. This received information may include the information depicted in FIG. 7. Referring to FIG. 7, the received information may include one or more of the following: a loan (or mortgage) reference number; the identity of the requestor (e.g., the lender 1500); the borrower's identity (e.g., name); the borrower's stated income; the borrower's address (e.g., street, city, state, and ZIP code); the borrower's occupation and the years of experience in that occupation; an estimated value (or appraisal) for the borrower's property (i.e., the borrower's current property and/or a property being mortgaged); an amount corresponding to the total loan amount requested by the borrower; and information indicating the property type (e.g., a condominium, a town house, a single family home, a 2-4 unit dwelling, or a multifamily dwelling). Moreover, the received information may include information indicating the purpose of the mortgage, such as whether the mortgage is for the purchase of a property, a mortgage refinancing, a mortgage refinancing with cash returned to the borrower (referred to as a "cash out" refinance), a home improvement loan, a debt consolidation loan, or any other type of mortgage loan, line of credit, or other financing.

The received information may also include one or more of the following: an indication of the borrower's credit worthiness, such as credit scores, credit history, delinquencies, outstanding balances on loans, and loan limits; a flag indicating the source of the borrower credit information (e.g., credit information provided by a lender or by a credit repository); a median price (or appraisal) for properties within a region or, alternatively, an estimated price for the borrower's property (listed in FIG. 7 as a "Combined Point Value").

The received information may also include demographic information, such as income estimates (or statistics) based on the borrower's occupation, experience, and region, such as a street address, neighborhood, city, state, country, or MSA (depicted on FIG. 7 as "Income Estimate").

Although the computing platform 5300 receives information primarily from the lender 1500, a skilled artisan would recognize that the computing platform 5300 may receive such information from any source (or entity) including lenders 1500, 1510, brokers 1700, 1710, borrowers 1600, 1610, and/or information sources 1800.

Referring again to FIG. 6, when receiving information (step 6100), the computing platform 5300 may interface with, or be embedded in, one or more systems (not shown), that provide financial information, credit information, or real estate information. Such systems include, for example, systems that are used to originate loans or (pre)approve loans or credit cards.

In one embodiment, the information depicted in FIG. 7 may be provided via a web-based input. FIG. 8 shows a web page for providing information to the processor 1350 (or computing platform 5300) via the Internet. A lender, a borrower, a broker, or any other entity seeking an Income Score may access the web page of FIG. 8 to provide the processor 1350 (or computing platform 5300) with information. The information provided via the web page of FIG. 8 may then be used by the computing platform 5300 to determine the Income Score.

Moreover, one of ordinary skill would recognize that the demographic information received by the computing platform 5300, such as income statistics (or estimates), may be stored in database 5600 and accessed when the computing platform 5300 receives borrower information, indicating a request for an Income Score.

Referring again to FIG. 6, to initialize variables for use in the Income Score model (step 6200), the computing platform 5300 may initialize one or more of the variables in the Income Score model based on the information received in step 6100. For example, based on the received information, the computing platform may initialize the variable CO, which represents a cash-out mortgage loan, to a "1" based on whether the borrower's loan provides cash-out to the borrower.

In one embodiment, the computing platform 5300 may initialize the variables listed in Table 2 below based on the information received in step 6100 (step 6200). Although Table 2 lists only six variables, one of ordinary skill would recognize that one or more variables may be used including, for example, the variables listed in FIG. 7 or any other variables that may suggest a borrower's veracity when self reporting income. The variable CREDIT_SCORE corresponds to an indication of the borrower's credit worthiness. The variables NCO, CO, and OTH correspond to the purpose of the loan: NCO represents a loan without cash out to the borrower; CO represents a loan with cash out to the borrower; and OTH represents any other loan purpose. The variable DELINQUENCIES corresponds to the number of late or non-payments accumulated by the borrower. The variable INCOME_DIFF may be determined based on the following equation:

$$\text{INCOME\_DIFF} = (\log(\text{stated income}) - \log(\text{income estimate}))/\text{Std dev} \quad \text{Equation 1}$$

where stated income is the borrower's reported income; income estimate is an estimate provided by an income estimation model; Std dev represents the standard deviation associated with the income estimate; and log represents a natural logarithm.

TABLE 2

Initialized Variables

CREDIT_SCORE = credit score expressed in integers, e.g. 715.
NCO = 1 if purpose is rate/term refinance, else 0.
CO = 1 if purpose is cash out refinance, else 0.
OTH = 1 if purpose is other, else 0.
DELINQUENCIES = number of delinquencies in borrower's credit report
INCOME_DIFF = (log(stated income) − log(income estimate))/Std dev
(Logs are natural logs.)

The income estimation model may correspond to published (or available) estimates of incomes (or salaries) based on occupation, experience, and region. In this case, the income estimation model simply provides an estimate of a borrower's income based on the borrower's occupation, years of experience, and address. The estimate may be in the form of a median (or mean) salary, i.e., hourly, weekly, monthly, or yearly salary. Moreover, the model may also include a statistic indicating the relative error, such as a standard deviation, associated with the income estimation model.

In cases where income information is not published (or available) for a specific occupation, region, and experience level, the income estimation model may perform a more complex estimation based on techniques such as linear regression or other statistical procedure. Nonetheless, even when a more complex estimation technique is used, the income estimate provided by the estimation model may still be in the form of a median (or mean) salary and a corresponding standard deviation associated with the specific income estimation model used. A skilled artisan would recognize that linear regression is known in the art and that software tools are commercially available to facilitate linear regression modeling. Moreover, income estimation models are also known and commercially available. For example, the Bureau of Labor Statistics provides several income estimation models that estimate income based on various factors including occupation, area, and/or experience.

To determine the Income Score (step 6300 of FIG. 6), the computing platform 5300 may determine the Income Score by multiplying the variables initialized in step 6200 by its corresponding coefficients (or weights) from the Income Score model. The computing platform 5300 may also scale the Income Score into a predetermined range, such as the range of 300 to 900. The computing platform 5300 may then provide the scaled Income Score to the lender or other entity that requested the Income Score (step 6400).

FIG. 9 shows an exemplary Income Score model. To determine the Income Score (step 6300), the computing platform 5300 may determine the product of each variable (e.g., CREDIT_SCORE) initialized in step 6200 and its corresponding model coefficient (e.g., +1). The computing platform 5300 may then sum all of the products to produce an Income Score (lines 1-7).

Moreover, in one aspect of the invention, the Income Score is scaled into a range of 300 to 900 such that an Income Score of 300 suggests that a borrower's stated income is probably faulty. On the other hand, an Income Score of 900 would indicate that the stated income value is probably reliable. FIG. 9 at lines 9-10 shows scaling the Income Score to 300 and 900 when the Income Score is less than 300 or greater than 900, respectively.

FIG. 10 depicts an exemplary web page for providing an Income Score. For example, the computing platform 5300 may provide the Income Score to the lender 1500 through the communication channel 1400. As shown in FIG. 10, the Income Score may provide the lender 1500 with an indication of whether the borrower's income, as stated on the borrower's loan application, is likely to be faulty.

By way of example only, FIG. 10 depicts that an Income Score below 500 may be considered at "highest risk" of being faulty, suggesting to the lender 1500 that a detailed review (or verification) of the borrower's stated income may be appropriate. An Income Score between 500-600 may be considered at "moderate risk" of being faulty, suggesting to the lender 1500 that an income verification based merely on credit bureau information may be appropriate. When an Income Score is above 700, the borrower's stated income is at "lowest risk" of being faulty, suggesting to the lender 1500 that no further verification of the borrower's stated income is necessary.

Figure 11:
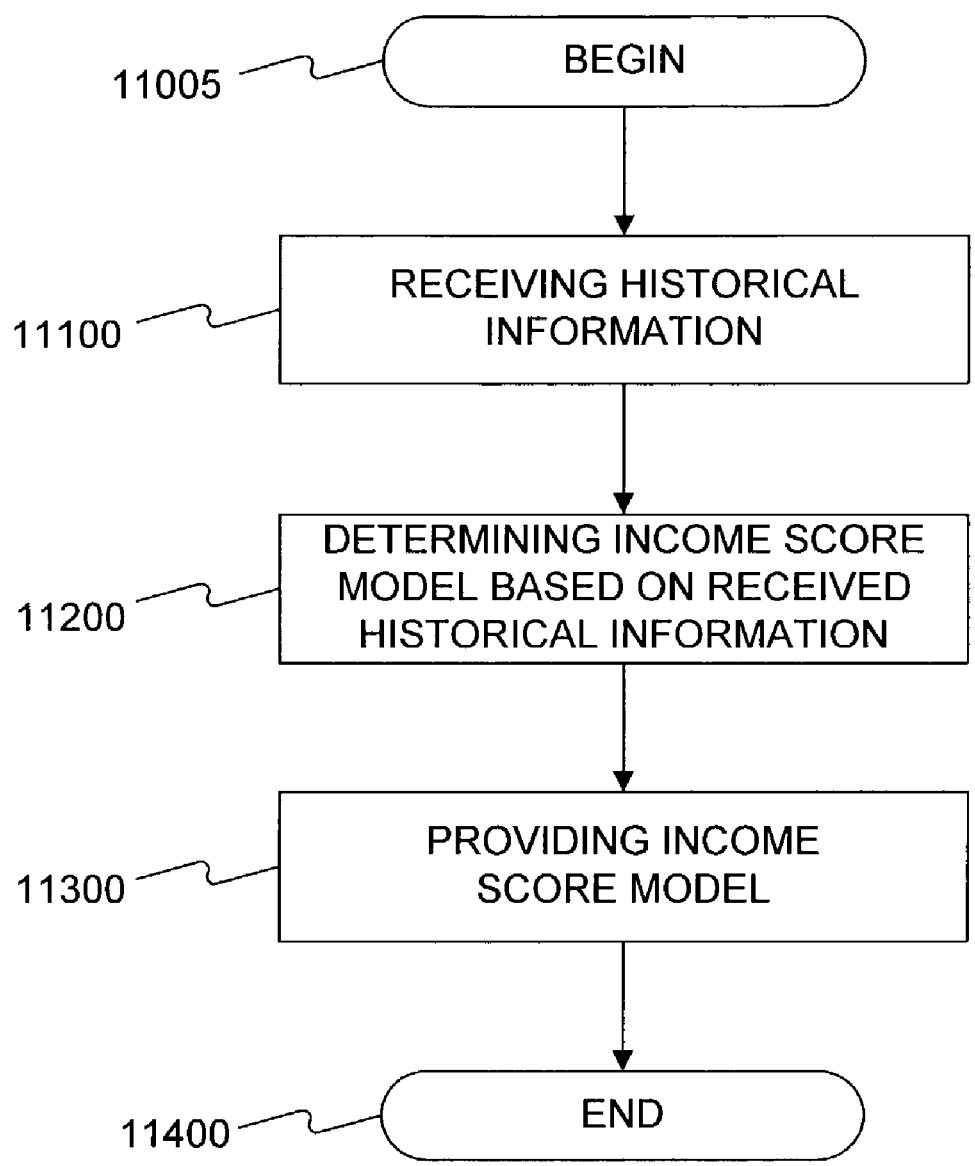
FIG. 11 is another exemplary flowchart for generating a model in accordance with systems and methods consistent with the present invention.

In one embodiment, the computing platform 5300 may also generate the Income Score model, as depicted in FIG. 11. The computing platform 5300 may begin by receiving historical (or truth) information (steps 11005-11100); determine the Income Score model based on the received historical information (step 11200); and end when it provides the Income Score model (steps 11300-11400).

The computing platform 5300 may receive historical information for one or more borrowers from various sources of information, such as database 5600 or the information sources 1800 (step 11100). The historical information may include any information that might indicate the accuracy of a borrower's stated income including one or more of the following: property information, borrower information, loan information, income information, credit information, and demographic information. The demographic information may also describe one or more of the following: the borrower; the borrower's property; and any other demographics, such income estimates based on occupation, experience, and region (or location).

In one aspect of the invention, the historical information for each borrower may also include the information depicted in FIG. 7 and income information that verifies the borrower's true (or actual) income. The verified income information for each borrower may include income information that is considered reliable and, preferably, accurate.

To determine the Income Score model, the computing platform 5300 may process the historical information received in step 11100 (step 11200). The received historical information may be processed based on quantitative techniques, such as statistics (e.g., logistic regression and PROBIT), neural networks, and/or any other approach that provides a model capable of providing an Income Score for a borrower's stated income. For example, standard statistical tools, such as tools commercially available from the SAS Institute, Inc., may be used to determine the Income Score model coefficients based on the received historical information such that the Income Score model provides Income Scores. The computing platform 5300 may then provide the determined Income Score model to one or more entities (e.g., lenders 1500, 1510 and/or brokers 1700, 1710), permitting those entities to determine (or use) the Income Scores.

Referring again to FIG. 9, the exemplary Income Score model lists several variables including CREDIT_SCORE, CO, NCO, OTH, DELINQUENCIES, and INCOME_DIFF. The coefficients 100, 1, −10, +10, 0, −30, and −100,000 are determined based on the received historical information from step 11100.

In one embodiment, the computing platform 5300 may use a statistical technique referred to as logistic regression to determine the coefficients of the Income Score model. Logistic regression models may be used to examine how various factors influence a binary outcome. An event (or result) that has two possible outcomes is a binary outcome (e.g., good/bad or faulty/reliable). As noted above, logistic regression modeling is available with many commercially available statistical software packages.

Figure 12:
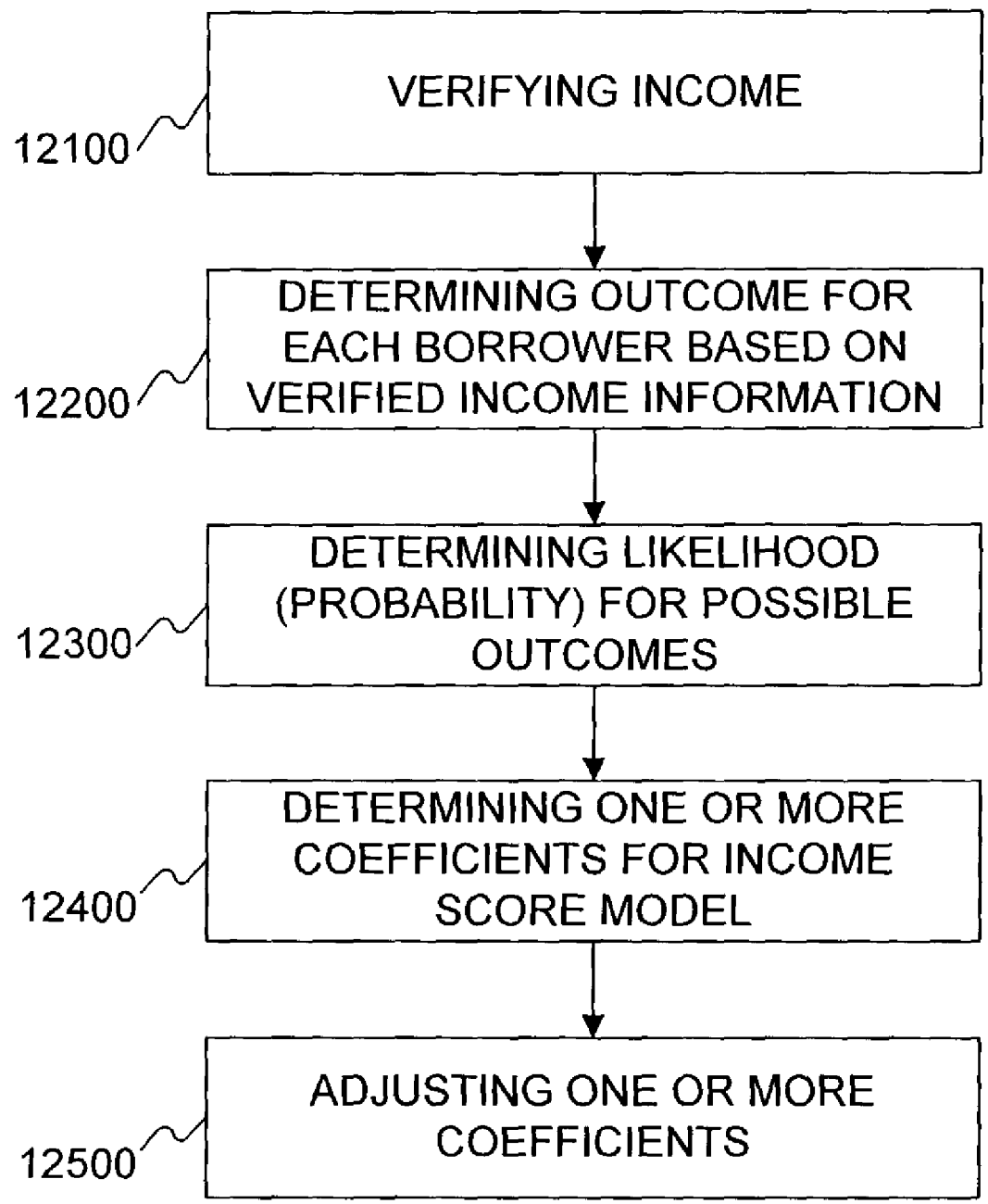
FIG. 12 is an exemplary flowchart for determining model coefficients in accordance with systems and methods consistent with the present invention.

FIG. 12 shows an exemplary flowchart depicting steps for using a logistic regression approach for determining the coefficients of the Income Score model. The logistic regression approach permits determining the model coefficients using the historical information received in step 11100.

Referring to FIG. 12, the computing platform 5300 may verify each borrower's stated income (step 12100); determine an outcome (also referred to as an outcome variable) for each borrower based on the historical information and the borrower's verified income (step 12200); determine the likelihood associated with possible outcomes (step 12300); determine coefficients for the Income Score model (step 12400); and adjust the coefficients by scaling the coefficients (or the estimated log odds/probability) into a range (step 12500).

To verify the borrower's stated income (step 12100), the computing platform 5300 may compare the borrower's stated income to a verified income value for the borrower. The verified income value for each borrower may be received as part of the historical information. Moreover, the verified income value may include income verification information provided by a credit bureau, by each borrower (e.g., pay stubs and W-2s), by each borrower's employer, and/or by other sources of reliable income information, such as loan, credit, and mortgage applications.

Based on the comparison, the computing platform 5300 may verify whether the borrower's stated income is valid. For example, if the verified income for a borrower is lower than the borrower's stated income, the borrower's stated income may be invalid. On the other hand, when the borrower's stated income is about equal (e.g., within 10%) to the borrower's verified income, the stated income may be considered valid. In one embodiment, the borrower's stated income is also considered valid if it is less than the borrower's verified income because the borrower has harmlessly understated income.

FIG. 13 shows an exemplary table showing received historical information for borrowers including the borrower's stated income, a verified income for the borrower, and an outcome. FIG. 13 also shows that for each borrower, the received historical information may include other borrower related information, such as a credit score; a mortgage type, such as cash out (CO), non-cash out (NCO), or other (OTH) mortgage type; delinquency information indicating late or nonpayment history; and a factor (labeled in FIG. 13 as INCOME_DIFF) based on the difference between the borrower's stated income and an income estimate derived from an income estimation model, as described above with respect to Equation 1. A skilled artisan would recognize that additional historical (or truth) information may also be received by the computing platform 5300 to determine the model coefficients including any other information describing the borrower, the loan, the borrower's property, the borrower's income, the borrower's credit, and any other information that may facilitate determining whether the borrower's stated income is likely to be faulty.

To determine the outcome for each borrower (step 12200), the computing platform 5300 may compare the verified income to the stated income. If the verified income is lower than the stated income, the computing platform 5300 may set the outcome to a "1," suggesting that the stated income is invalid. On the other hand, if the verified income is about equal to or greater than the stated income, the computing platform 5300 may set the outcome to "0," suggesting that the stated income is valid. Referring again to FIG. 13, the computing platform 5300 thus processes the historical information for each borrower to determine an outcome based on the borrower's stated income and verified income, storing the information depicted in FIG. 13 in the database 5600.

To determine the likelihood for each of the possible outcomes (step 12300), the computing platform 5300 may further process the historical information, using a logistic regression, to determine the odds that an outcome is possible. For example, the computing platform 5300 may determine a likelihood that the stated income is faulty (or invalid) given the variables CREDIT_SCORE, CO, NCO, OTH, DELINQUENCIES, and INCOME_DIFF.

In one embodiment, the computing platform 5300 uses the following equation to determine the odds, or likelihood that an outcome, such as a faulty stated income, is possible:

$$\text{Log}(p/1-p)) = a + b_1(\text{CREDIT\_SCORE}) + b_2(CO) + \\ b_3(NCO) + b_4(OTH) + b_5(\text{DELINQUENCIES}) + \\ b_6(\text{INCOME\_DIFF}) + \ldots b_n \, (n^{th} \text{ Variable})$$

Equation 2 where $\text{Log}(p/(1-p))$ represents the log odds (also referred to as LOGIT) that the stated income value is likely to be faulty; p represents the probability of a borrower having a "0" outcome (or a "1" outcome); a, $b_1$, $b_2$, ... $b_n$ represent the initial coefficients of the Income Score model; and n represents the number of coefficients used in the Income Score model, where $b_n$ represents the $n^{th}$ coefficient. Before the computing platform 5300 utilizes a logistic regression, the values of a, $b_1$, $b_2$, ... $b_n$, and p may be unknown.

In this example, the computing platform 1500 uses seven coefficients (i.e., n=6) corresponding to a, $b_1$, $b_2$, $b_3$, $b_4$, $b_5$, and $b_6$: Intercept, CREDIT_SCORE, CO, NCO, OTH, DELINQUENCIES, and INCOME_DIFF. The value "100" (line 1 of FIG. 9) corresponds to the variable "a" in Equation 2. The variable "a" is referred to herein as the Intercept that centers the Income Score model distribution. For example, in an Income Score model with Income Scores between 1 and 10, the Intercept (a) may be selected to center that model at 5. Although this example uses seven coefficients, a skilled artisan would recognize that additional (or fewer) coefficients may be used instead.

Although p is an unknown value at the start of the logistic regression, p may conform to the following equation:

$$p = 1/(1+e^z)$$

Equation 3 where τ is the following:

$$\tau = a + b_1(\text{CREDIT\_SCORE}) + b_2(CO) + \\ b_3(NCO) + b_4(OTH) + b_5(\text{DELINQUENCIES}) + \\ b_6(\text{INCOME\_DIFF}) + \ldots b_n (n^{th} \text{ Variable})$$

Equation 4

The computing platform 5300 may then determine an estimate of the coefficients of the Income Score model (step 12400). That is, the computing platform 5300 may iteratively solve for an estimate of a, b1, b2 . . . $b_n$ using Equations 2-4.

Although the computing platform 5300 may utilize a logistic regression approach as described in this example, a skilled artisan would recognize that any other approach may be used instead to determine the coefficients. Examples of such approaches include Probit regression, standard regression, neural networks, and any other statistical or quantitative approach that may provide model coefficients based on historical (or "truth") information.

Referring again to FIG. 12, to adjust the coefficients (step 12500), the computing platform 5300 may then scale the coefficients a, $b_1$, $b_2$, . . . $b_n$. In one embodiment, the computing platform 5300 may scale the coefficients by multiplying each coefficient by the following equation:

$$\text{actual coefficient} = \text{initial coefficient} * (60/\ln(2))$$

Equation 5 where ln is a natural logarithm.

By using Equation 5, the computing platform 5300 may scale the initial coefficients such that every 60 Income Score points doubles the odds that a borrower's stated income is likely to be faulty. The scaled coefficients may be used as the actual coefficients used in the Income Score model, such as the Income Score model illustrated in FIG. 9. Accordingly, the computing platform 5300 may determine coefficients for the Income Score model based on a logistic regression approach using historical (or "truth") information. The computing platform 5300 may then determine the Income Score based on the Income Score model.

The computing platform may then determine Income Scores for borrowers based on the Income Score model. For example, for a borrower applying for a mortgage, the computing platform 5300 may receive information for that borrower. In this example, the received information indicates a credit score (CREDIT_SCORE=of 700), a non-cash out mortgage (NCO=1), and no delinquencies in the borrower's credit history (DELINQUENCIES=0). Moreover, the borrower's stated income and income estimate are the same—in this example $100,000. The difference in the stated and estimated incomes, in this case, is 0 based on Equation 1 above. Referring to the model depicted in FIG. 9, the borrower would have an Income Score of 810.

In contrast, when another borrower applies for a mortgage, the computing platform 5300 receives information for that borrower. In this example, all the received information is the same as the previous example (i.e., CREDIT_SCORE=700, NCO=1, DELINQUENCIES=0). But in this case, although the borrower's stated income is still $100,000, the income estimate received from an income estimation model suggests an income of $50,000. In essence, the income estimation model suggests that the borrower has overstated his income by $50,000. Referring again to the model depicted in FIG. 9, the borrower's Income Score is 300, which is scaled up from a calculated value of 116. The 300 score corresponds to a low Income Score that suggests a very high likelihood that the borrower's stated income is false.

Furthermore, although the embodiments above refer to processing information related to mortgages, in its broadest sense systems and methods consistent with the present invention may provide an Income Score for any type of loan, credit instrument, or line of credit, or any other purpose where knowledge of income is important (e.g. marketing lists). Moreover, the Income Score may be used in any type of transaction where an assessment is made of a self-reported (or stated) income. For example, the Income Score may be used to assess the reliability of stated income for any type of transaction including verifying income on a rental or lease agreement, preapproving credit card applications, verifying stated income on a credit card application, and verifying income on an employment application.

For example, when a property owner leases an apartment, the property owner may verify the renter's income before entering into the lease agreement. Systems and methods consistent with the present invention may be used as part of this process to determine whether the renter's stated income is likely to be faulty. A landlord (or management company) may then decide whether to pursue an expensive comprehensive income verification process based on the Income Score.

A credit card issuer may also use the Income Score to determine the likelihood that a credit card applicant's stated income is faulty. Based on the Income Score, the credit card issuer can decide whether to approve the credit card application immediately or upgrade to a comprehensive income verification process.

Another example of a transaction where the Income Score may be utilized includes assessing the likelihood that a job applicant's income history, as listed in the employment application, is likely to be faulty. Because an employer may offer the job applicant a salary based on income history, the employer has an interest in determining the likelihood that the applicant's stated income history is likely to be faulty.

Although the above description of income uses wage income, in its broadest sense systems and methods consistent with the present invention may provide an Income Score and an Income Score model that account for wage and nonwage income.

The systems disclosed herein may be embodied in various forms including, for example, a data processor, such as a computer that also includes a database. Moreover, the above-noted features and other aspects and principles of the present invention may be implemented in various environments. Such environments and related applications may be specially constructed for performing the various processes and operations of the invention or they may include a general-purpose computer or computing platform selectively activated or reconfigured by code to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter.

What is claimed is:

1. A method performed by a computer for applying data to generate a prediction of whether a stated income is faulty or reliable, the method comprising steps of:
    the computer accessing income data reflecting stated incomes of the previous borrowers, wherein the previous borrowers include a first group of previous borrowers having reliable stated incomes and a second group of previous borrowers having faulty stated incomes;
    the computer processing the income data to identify the previous borrowers in the first group and the previous borrowers in the second group;
    the computer accessing borrower data reflecting characteristics of the previous borrowers;
    the computer determining predictive values of the characteristics of the previous borrowers using both the characteristics of the previous borrowers in the first group and the characteristics of the previous borrowers in the second group, wherein the predictive values represent correlations between the characteristics of the previous borrowers and accuracy of the stated incomes of the previous borrowers;
    the computer storing, in a memory device, data reflecting the predictive values; and
    the computer applying the data reflecting the predictive values to corresponding characteristics of a current borrower to generate a prediction of whether a stated income of the current borrower is faulty or reliable.

2. The computer-implemented method of claim 1, wherein the stated income of the current borrower is provided by the current borrower.

3. The computer-implemented method of claim 1, wherein the stated income of the current borrower is from a source other than the current borrower.

4. The computer-implemented method of claim 1, wherein the stated incomes of the previous borrowers are verified to confirm accuracy.

5. The computer-implemented method of claim 1, wherein the data reflecting the predictive values comprise coefficients incorporated into a model, the model using income estimate to provide a score for the current borrower.

6. The computer-implemented method of claim 5, wherein the score is based at least partly on a difference between the stated income of the current borrower and the income estimate.

7. The computer-implemented method of claim 6, further comprising the step of:
    defining the difference based on the following equation:

$$\text{difference} = (\log(\text{the stated income}) - \log(\text{the income estimate}))/\text{Std dev}$$

wherein Std dev represents a standard deviation associated with the model, and log represents a natural logarithm.

8. The computer-implemented method of claim 1, wherein the data reflecting the predictive values is used to verify stated incomes for a plurality of current borrowers.

9. The computer-implemented method of claim 1, wherein the data reflecting the predictive values are incorporated into a model that determines a score for the current borrower for each of a plurality of loans.

10. The computer-implemented method of claim 1, further comprising:
    accessing verification income data for the previous borrowers reflecting verified incomes of the previous borrowers; and
    comparing the stated incomes of the previous borrowers income values with the verified incomes of the previous borrowers to determine the predictive values.

11. The computer-implemented method of claim 10, further comprising determining a difference between the stated incomes of the previous borrowers and the verified incomes of the previous borrowers, such that when the difference exceeds about 10%, the stated incomes are considered invalid.

12. The computer-implemented method of claim 1, wherein the predictive values are different for different types of loans.

13. The computer-implemented method of claim 12, further comprising determining a probability that the stated income of the current borrower is faulty for each of the different types of loans.

14. The computer-implemented method of claim 13, further comprising verifying the stated income of the current borrower, adding the stated income of the current borrower to the income data reflecting stated incomes of the previous borrowers, and determining new predictive values to predict whether a stated income of a new borrower is likely to be faulty.

15. The computer-implemented method of claim 14, wherein the new predictive values comprise a plurality of coefficients calculated using a statistical technique.

16. The computer-implemented method of claim 15, wherein the statistical technique incorporates logistic regression to calculate the plurality of coefficients.

17. The computer-implemented method of claim 16, wherein the plurality of coefficients are calculated based on whether the stated incomes of the previous borrowers are determined to be reliable.

18. The computer-implemented method of claim 17, wherein the coefficients are adjusted to reflect faulty stated incomes for one or more of the previous borrowers.

19. The computer-implemented method of claim 1, wherein the data reflecting the predictive values comprises a plurality of coefficients calculated using a neural network.

20. The computer-implemented method of claim 1, wherein the data reflecting the predictive values comprises a plurality of coefficients determined using a rules-based expert system.

21. The computer-implemented method of claim 1, further comprising the step of:
    providing a model incorporating the data reflecting the predictive values.

22. The computer-implemented method of claim 21, wherein
    the model is provided using the Internet.

23. The computer-implemented method of claim 21, wherein
    the model is provided such that a lender may use the model to approve a mortgage loan.

24. The computer-implemented method of claim 21, wherein
    the model is provided such that a lender may use the model to approve a credit card.

25. The computer-implemented method of claim 1, wherein the data reflecting the predictive values are used to generate a score, and a low score corresponds to a high likelihood that the stated income of the current borrower is faulty and a high score corresponds to a low likelihood that the stated income of the current borrower is faulty.

26. The computer-implemented method of claim 25, wherein the score is within a range of about 300 to about 900.

27. The computer-implemented method of claim 1, wherein the stated income of the current borrower reflects a combined income of the current borrower and one or more additional current borrowers.

28. The computer-implemented method of claim 27, wherein scores are provided for the plurality of current borrowers and the scores are scaled to a range.

29. The computer-implemented method of claim 28, wherein the range is from about 300 to about 900.

30. The computer-implemented method of claim 1, wherein the data reflecting the predictive values are used to generate a score, and a high score corresponds to a high likelihood that the stated income of the current borrower is faulty and a low score corresponds to a low likelihood that the stated income of the current borrower is faulty.

31. A system for applying data to generate a prediction of whether a stated income is faulty or reliable, the system comprising:
   means for accessing income data reflecting stated incomes of previous borrowers, wherein the previous borrowers include a first group of previous borrowers having reliable stated incomes and a second group of previous borrowers having faulty stated incomes;
   means for processing the income data to identify the previous borrowers in the first group and the previous borrowers in the second group;
   means for accessing borrower data reflecting characteristics of the previous borrowers;
   means for determining predictive values of the characteristics of the previous borrowers using both the characteristics of the previous borrowers in the first group and the characteristics of the previous borrowers in the second group, wherein the predictive values represent correlations between the characteristics of the previous borrowers and accuracy of the stated incomes of the previous borrowers;
   a memory device configured to store data reflecting the predictive values; and
   means for applying the data reflecting the predictive values to corresponding characteristics of a current borrower to generate a prediction of whether a stated income of the current borrower is faulty or reliable.

32. A system for applying data to generate a prediction of whether a stated income is faulty or reliable, the system comprising:
   at least one memory comprising computer executable code that:
   accesses income data reflecting stated incomes of previous borrowers, wherein the previous borrowers include a first group of previous borrowers having reliable stated incomes and a second group of previous borrowers having faulty stated incomes;
   processes the income data to identify the previous borrowers in the first group and the previous borrowers in the second group;
   accesses borrower data reflecting characteristics of the previous borrowers;
   determines predictive values of the characteristics of the previous borrowers using both the characteristics of the previous borrowers in the first group and the characteristics of the previous borrowers in the second group, wherein the predictive values represent correlations between the characteristics of the previous borrowers and accuracy of the stated incomes of the previous borrowers;
   stores data reflecting the predictive values; and
   applies the data reflecting the predictive values to corresponding characteristics of a current borrower to generate a prediction of whether a stated income of the current borrower is faulty or reliable.

33. The system of claim 32, wherein the stated income of the current borrower is provided by the current borrower.

34. The system of claim 32, wherein the stated income of the current borrower is from a source other than the current borrower.

35. A computer-readable non transitory storage medium comprising a stored set of computer-executable instructions for applying data to generate a prediction of whether a stated income is faulty or reliable which when executed by a processor perform a method comprising:
   accessing income data reflecting stated incomes of previous borrowers, wherein the previous borrowers include a first group of previous borrowers having reliable stated incomes and a second group of previous borrowers having faulty stated incomes;
   processing, using the computing platform, the income data to identify the previous borrowers in the first group and the previous borrowers in the second group;
   accessing borrower data reflecting characteristics of the previous borrowers;
   determining predictive values of the characteristics of the previous borrowers using both the characteristics of the previous borrowers in the first group and the characteristics of the previous borrowers in the second group, wherein the predictive values represent correlations between the characteristics of the previous borrowers and accuracy of the stated incomes of the previous borrowers;
   storing data reflecting the predictive values; and
   applying the data reflecting the predictive values to corresponding characteristics of a current borrower to generate a prediction of whether a stated income of the current borrower is faulty or reliable.

* * * * *

UNITED STATES PATENT AND TRADEMARK OFFICE
CERTIFICATE OF CORRECTION

PATENT NO.         : 7,797,166 B1                                    Page 1 of 1
APPLICATION NO. : 10/283338
DATED              : September 14, 2010
INVENTOR(S)        : Bradley et al.

It is certified that error appears in the above-identified patent and that said Letters Patent is hereby corrected as shown below:

Claim 32, col. 20, line 18, after "reliable" delete "." and insert -- ; and at least one data processor that executes the code. --.

Signed and Sealed this

Twenty-third Day of November, 2010

David J. Kappos
*Director of the United States Patent and Trademark Office*